(12) United States Patent
Holl, II et al.

(10) Patent No.: US 7,926,087 B1
(45) Date of Patent: Apr. 12, 2011

(54) CENTRALIZING ACCESS REQUEST AUTHORIZATIONS FOR STORAGE SYSTEMS

(75) Inventors: James Hartwell Holl, II, Los Gatos, CA (US); James J Voll, Palo Alto, CA (US); Konstantinos Roussos, Sunnyvale, CA (US); Anshu Surana, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 748 days.

(21) Appl. No.: 11/948,270

(22) Filed: Nov. 30, 2007

(51) Int. Cl.
*H04L 9/32* (2006.01)
(52) U.S. Cl. ................................. 726/2; 726/3; 726/4
(58) Field of Classification Search .............. 713/150, 713/165–168, 189, 193–194; 726/2–7; 709/225, 709/229; 380/44
See application file for complete search history.

(56) References Cited

U.S. PATENT DOCUMENTS 6,421,711 B1 * 7/2002 Blumenau et al. ............ 709/213

OTHER PUBLICATIONS

U.S. Appl. No. 11/948,270, filed Jan. 8, 2004, Fair.
U.S. Appl. No. 10/721,596, filed Nov. 25, 2003, Fair.
U.S. Appl. No. 11/601,095, filed Nov. 25, 2003, Fair.

* cited by examiner

*Primary Examiner* — Hosuk Song
(74) *Attorney, Agent, or Firm* — Stattler-Suh PC

(57) ABSTRACT

Described herein is a centralized access request authorization system comprising an authorization module, one or more server systems, and a collection of one or more storage systems connected through a network. An application executing on a server system receives an access request for accessing the storage system collection and sends an authorization request to the authorization module for authorizing the access request. The application may be configured to only send the access request to the storage system collection if it first receives an authorization of the access request from the authorization module. Since the application is configured to do such, the storage system performs the access request without performing any authorization verification on the access request. The authorization module may receive authorization requests from a plurality of applications (executing on a plurality of server systems) and determine received authorization requests using a single repository of access permission information.

18 Claims, 9 Drawing Sheets

CENTRALIZING ACCESS REQUEST AUTHORIZATIONS FOR STORAGE SYSTEMS

FIELD OF THE INVENTION

Embodiments of the present invention relate to storage systems, and in particular, to centralizing access request authorizations for storage systems.

BACKGROUND

A storage system is a processing system adapted to store and retrieve data on storage devices, such as disks. The storage system includes a storage operating system that implements a file system to logically organize the data as one or more storage objects on the storage devices. For example, the file system may organize the data on the storage devices as a hierarchical structure of directories and files, as one or more volumes, as one or more logical units, etc. A storage system may be configured to allow particular clients (e.g., users, server systems, applications, devices, etc.) to access its contents, for example, to read or write data to the storage devices.

A saver system coupled with the storage system through a network may execute an application that "connects" to the storage system through the network to access particular data of the storage system. An application of the server system may send an "access request" to the storage system specifying a particular operation (e.g., read or write operation) to be performed on a particular storage object stored on the storage system. The access request may originate and be received from a particular user of the application. For example, a particular administrator-level user may request a backup operation of a particular email database (storage object) stored on the storage system.

Before performing a received access request, a storage system will typically perform an authorization process that determines whether or not the received access request is permitted and allow or not allow the received access request to be performed. Typically, the authorization process performed by the storage system is a rudimentary process that does not determine authorization of access requests based on several parameters. For example, a typical authorization process may simply determine whether the user sending the access request has permission to access the storage system, and if so, allows the access request to be performed. As such, typical authorization processes do not provide granular/precise control of access to storage systems.

Also, each storage system typically determines authorization of access requests independently by maintaining a separate access list (e.g., comprising a list of users allowed to access the storage system) that is used to determine authorizations of access requests. As such, for an entity implementing a large collection of server systems and storage systems, the entity must individually maintain and update each access list for each storage system as users of the various server systems and access permissions continually change. As such, there is a need for a more efficient and precise method for authorizing access requests for storage systems.

SUMMARY

The embodiments described herein provide an authorization system for authorizing access requests for storage systems. In some embodiments, the authorization system comprises an authorization module, one or more server systems, and a collection of one or more storage systems connected through a network. Each server system may execute an application configured to receive an access request for accessing a storage system and send an authorization request to the authorization module for authorizing the access request (by determining whether the access request is permitted). Each application may be further configured to only send the access request to a storage system if it first receives an authorization of the access request from the authorization module. The authorization module may receive authorization requests from a plurality of applications (executing on a plurality of server systems) that wish to access a plurality of storage systems. As such, access request authorizations for a plurality of server systems and a plurality of storage systems may be centralized in the authorization module, thus removing authorization duties from the server and/or storage systems. Further, the authorization module may determine authorization requests using a single repository of access permission information that may be easily maintained and updated (since any modifications to the access permission information may be performed once on the single repository (rather than performing modifications to multiple access lists maintained on multiple storage systems).

An application that uses the authorization module for authorizing access requests is referred to herein as a participant application. Two or more participant applications may reside and execute on the same server system. A storage system that uses the authorization module for authorizing access requests is referred to herein as a participant storage system. In some embodiments, an initiation phase is performed for each participant application and participant storage system prior to implementing the authorization module. In the initiation phase, an application may send an initiation request to the authorization module, the initiation request containing credential information describing the participant application. The credential information may include information indicating that the participant application is configured to properly implement the authorization module (i.e., is configured to first receive an authorization of an access request from the authorization module prior to sending the access request to a participant storage system). Upon validating the initiation request based on the credential information, the authorization module may generate a unique identifier and password for the participant application. The authorization module may transmit the unique identifier and password to the participant application and to each participant storage system (each participant storage system storing a record of the received unique identifier and password in a listing of participant applications).

During a runtime phase subsequent to the initiation phase, the unique identifier and password may then be used by the participant application to directly connect with and send access requests to any participant storage system. In some embodiments, prior to sending an access request to a participant storage system, each participant application may be configured to send an authorization request to the authorization module for authorizing the access request. In these embodiments, only upon receiving an authorization of the access request from the authorization module does the participant application then send the access request to a participant storage system. Each participant storage system may be configured to perform any access request received from a participant application without determining authorization of the received access request.

As such, a participant application is an application that is configured to properly implement the authorization module (i.e., is configured to first send an authorization request to and receive an authorization from the authorization module prior to sending an access request to a participant storage system) and has undergone the initiation phase to receive a unique identifier and password. After connecting with a participant storage system using the unique identifier and password, a participant application is completely "trusted" by the participant storage system (i.e., the participant storage system will perform any access request received from the participant application without performing any validation or authorization checks on the received access request). Each participant application is completely trusted by each participant storage system since, as discussed above, each participant application is configured to defer authorization of its access requests to the authorization module. As such, each participant storage system no longer needs to expend processing resources and time required to determine authorization of access requests as such is authorization determinations are centralized in the authorization module.

In some embodiments, the authorization system includes a collection of storage systems, each storage system comprising a set of storage devices. The collection of storage systems stores one or more storage objects. As used herein, a storage object comprises any logically definable storage element stored or contained within a collection of storage systems (such as one or more logical units, one or more volumes, one or more storage devices of a storage system, or all storage devices of all storage systems in the collection). In some embodiments, an access request originates from a particular user and specifies a particular operation (e.g., read or write operation) to be performed upon a particular storage object stored in the collection of storage systems. In these embodiments, the authorization module determines authorization of access requests based on the user, operation, and storage object. The authorization module may be configured so that it will authorize an access request only upon determining that the particular user is authorized to perform the particular operation on the particular storage object specified by the access request.

As such, authorization of access requests may be controlled at a granular/precise level based on several parameters (e.g., user, operation, and storage object parameters). In these embodiments, the size and complexity of the access permission information used by the authorization module to determine authorization of access requests may increase significantly when doing so at a granular level. Thus, centralization of the authorization of access requests within an authorization module that uses a single repository of access permission information is particularly advantageous as it removes the need to maintain and update multiple large and complex repositories of access permission information.

In some embodiments, a participant application comprises a lower-level application that executes on a server system and interfaces with the collection of storage systems to access storage devices of the storage systems. In these embodiments, the participant application interfaces with an upper-level application that executes on the server system and supports a set of one or more operations (e.g., archive, backup, restore, etc.) that may be performed on the collection of storage systems. A user may interact with the upper-level application (e.g., via a graphical user interface of the upper-level application) to submit access requests specifying operations to be performed on particular storage objects of the collection of storage systems. The upper-level application receives the access requests from the user and sends them to the lower-level application (participant application) for handling the access requests. In some embodiments, the participant application handles a received access request by either sending the access request to the collection of storage systems for execution or by rejecting the access request if the authorization module does not authorize the access request.

As such, a lower-level application (participant application) interacts with an upper-level application to receive access requests and interacts with the authorization module and the collection of storage systems to handle the received access requests. In some embodiments, the upper and lower-level applications execute on a server system that implements a file system that organizes storage objects of the collection of storage systems. Each storage system, however, may implement a storage file system that organizes storage objects of the storage system in a different manner than the file system implemented on the server system. In these embodiments, the lower-level application may receive an access request having a server address path to a particular storage object (the server address path being specified by the server file system) and translate/map the server address path to a storage address path to the particular storage object (the storage address path being specified by the storage file system). The lower-level application may then use the storage address path to handle the access request.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary details.

The description that follows is divided into three sections. Section I describes a storage system environment in which some embodiments operate. Section II describes an initiation phase for registering applications that participate in the centralized authorization system. Section III describes a runtime phase for implementing the centralized authorization system.

I. Storage System Environment

Figure 1:
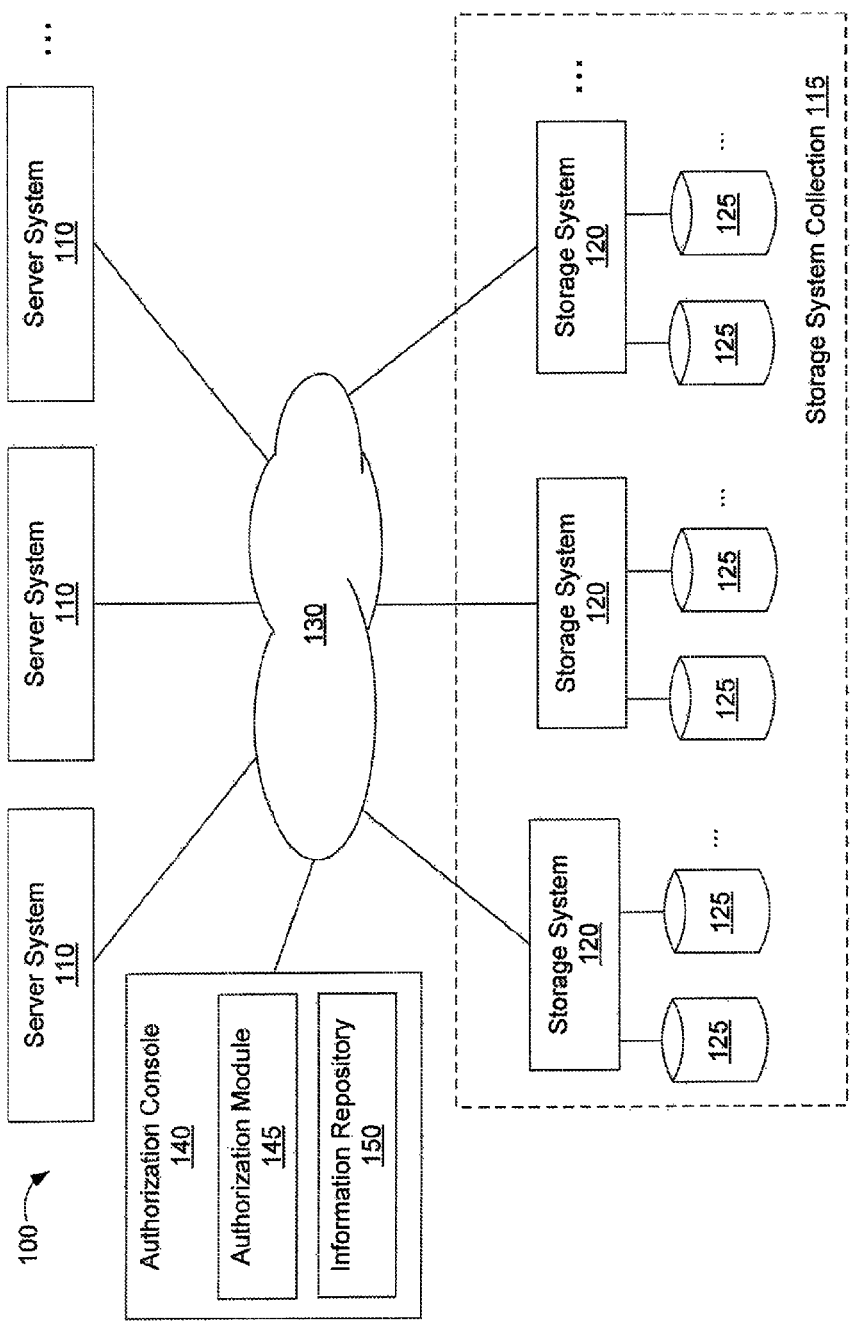
FIG. 1 is a schematic block diagram of an exemplary storage system environment in which some embodiments operate.

FIG. 1 is a schematic block diagram of an exemplary storage system environment 100 in which some embodiments operate. The environment 100 comprises a set of one or more server systems 110, a collection 115 of one or more storage systems 120 (each storage system 120 comprising a set of one or more storage devices 125), and an authorization console 140 that are connected via a connection system 130. The connection system 130 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the collection of storage systems 115 to store and manage data in the storage devices 125 of the storage systems 115. Interaction between a server system 110 and a storage system 120 can enable the provision of storage services. That is, server system 110 may request the services of the storage system 120, and the storage system 120 may return the results of the services requested by the server system 110, by exchanging packets over the connection system 130.

The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of storage devices 125, preferably on one or more writable storage device media (such as magnetic disks, video tape, optical, DVD, magnetic tape, and any other similar media adapted to store information, including data and parity information). The storage system 120 may implement a file system to logically organize the data as storage objects on the storage devices 125 (as discussed below in relation to FIG. 3). A server system 110 may execute one or more applications that submit access requests for accessing particular storage objects on the storage devices 125. The authorization console 140 may comprise a computer system that executes an authorization module 145 for authorizing the access requests, wherein authorized access requests are sent to a storage system 120 for execution. The authorization console 140 may use a centralized repository of access permission information 150 to determine authorization of access requests. In some embodiments, the authorization module 145 resides and executes on the authorization console 140 which is external and separate from the server and storage systems. In other embodiments, the authorization module 145 executes on a server system 110 or a storage system 120.

Server System

Figure 2:
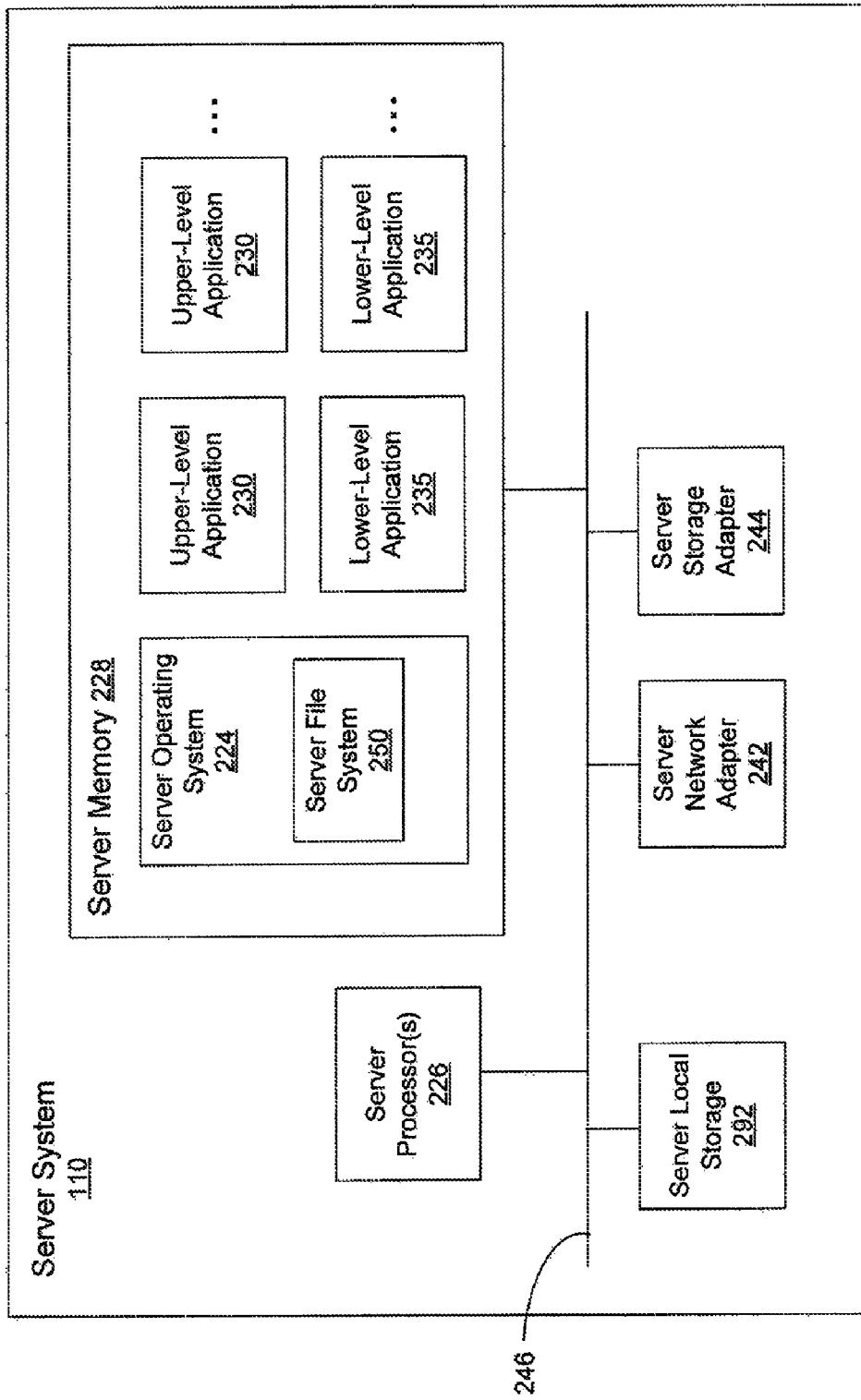
FIG. 2 is a schematic block diagram of an exemplary server system that may be employed in the storage system environment of FIG. 1.

FIG. 2 is a schematic block diagram of an exemplary server system 110 that may be employed in the storage system environment of FIG. 1. The server system 110 comprises server processor(s) 226, server memory 228, a server network adapter 242, a server storage adapter 244, and a server local storage 292 coupled by a bus 246.

The server processors 226 are the central processing units (CPUs) of the server system 110 and, thus, control the overall operation of the server system 110. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 228 comprises storage locations that are addressable by the processor 226 and adapters (a server network adapter 242 and a server storage adaptor 244) for storing software program code, such as software described herein. The server processor 226 and server adapters may, in turn, comprise processing elements and/or logic circuitry configured to execute the software code. Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 242 comprises a plurality of ports adapted to couple the server system 110 to one or more other computer systems over point-to-point links, wide area networks, virtual private networks implemented over a public network (Internet) or a shared local area network. The server network adapter 242 thus may comprise the mechanical, electrical and signaling circuitry needed to connect the node the network.

The server storage adapter 244 cooperates with a server operating system 224 executing on the server system 110 to access data from storage devices 125 of a collection of storage systems 115 (shown in FIG. 1). The server storage adapter 244 comprises a plurality of ports having input/output (I/O) interface circuitry that couples the devices 125 over an I/O interconnect arrangement (such as a fibre channel (FC) link topology). Server local storage 292 is a device that stores information within server system 110 (such as the server operating system 224, lower and upper-level applications 235 and 230, and data). Server system 110 loads information stored on the server local storage 292 into server memory 228 from which they are accessed by server processors 226.

As discussed above, server memory 228 comprises storage locations for storing software code that are addressable by the processor 226 for executing the software code. Such software code may include a server operating system 224, one or more upper-level applications 230, and one or more lower-level applications 235. The server operation system 224 can be, for example, UNIX®, Windows NT®, Linux®, or any other general-purpose operating system. The server operating system 224 implements a server file system 250 that provides it logical/virtual representation of how data (files) are organized in one or more directories on the server local storage 292. Examples of common file systems include New Technology File System (NTFS), File Allocation Table (FAT), Hierarchical File System (HFS), Universal Disk Format (UDF), UNIX® file system, etc. in some embodiments, the server system 110 is connected with a collection of storage systems 115 (via the server storage adapter 244 and connection system 130) that stores a plurality of storage objects. In these embodiments, the server file system 250 may also provide a logical/virtual representation of the storage objects stored on the collection of storage systems 115. The server file system 250 may do so, for example, by specifying a particular server address path tor each storage object stored on the collection of storage systems 115.

In some embodiments, the server system 110 also executes one or more upper-level applications 230. An upper-level application may support a set of one or more operations that may be performed on one or more storage objects stored on the collection of storage systems 115. The set of operations may comprise read or write-type operations (e.g., retrieve, archive, backup, restore, etc.). An upper-level application 230 may be configured for to particular purpose (e.g., email database management, multimedia file management, etc.) and thereby provide a set of operations specific for its intended purpose. For example, an upper-level application 230 may comprise an email database application (such as Microsoft®

Exchange Server provided by Microsoft Corp., of Redmond, Wash.) that provides archive, backup, and restore operations for maintaining an email database storing email information. Since the upper-level application 230 supports and provides the set of operations from which the user selects, the upper-level application 230 has specific information regarding requested operations and the context of the requested operations. A user may interact with the upper-level application (e.g., via a graphical user interface) to submit an access request that specifies a particular operation to be performed on a particular storage object. The upper-level application 230 receives access requests from users and sends the access requests to a lower-level application 235 for handling the access requests.

In some embodiments, a lower-level application 235 (participant application) interacts with an upper-level application 230 to receive access requests and also interacts with the authorization module 145 and the collection of storage systems 115 to handle the received access requests. In some embodiments, the lower-level application 235 handles a received access request by either sending the access request to the collection of storage systems 115 for execution (if the authorization module 145 determines the access request is permitted and authorizes the access request) or by rejecting the access request (if the authorization module 145 determines the access request is not permitted and does not authorize the access request). As such, the upper-level application 230 and lower-level application 235 work in conjunction to receive and process access requests from a user. An example of such is where the upper-level application 230 comprises a backup management engine (e.g., the SnapManager® program provided by Network Appliance, Inc., of Sunnyvale, Calif.) and the lower-level application 235 comprises a storage system interface engine (e.g., the SnapDrive® program provided by Network Appliance, Inc., of Sunnyvale. Calif.) that work in conjunction to receive and process access requests from a user for archiving and restoring a database system.

In some embodiments, the upper and lower-level applications execute on a server system 110 that implements a server file system 250 that logically organizes storage objects stored on the collection of storage systems 115. The server file system 250 may do so, for example, by specifying a particular server address path for each storage object stored on the collection of storage systems 115. As discussed below, each storage system, however, may implement a storage file system that organizes storage objects of the storage system in a different manner than the server file system implemented on the server system. As known in the an, these different layers of file systems may occur, for example, where the server and storage systems are configured as a Storage Area Network (SAN), whereby a server system is connected with a storage system using, for example, an Internet Small Computer System Interface (iSCSI) or Fibre Channel Protocol (FCP) connection. In these embodiments, the lower-level application 235 may receive an access request having a server address path to a particular storage object (the server address path being specified by the server file system) and translate/map the server address path to a storage address path to the particular storage object (the storage address path being specified by the storage file system). The lower-level application 235 may do such address mapping using a mapping table that is stored in server memory 228. The lower-level application may then use the storage address path to handle the access request.

Storage System

Figure 3:
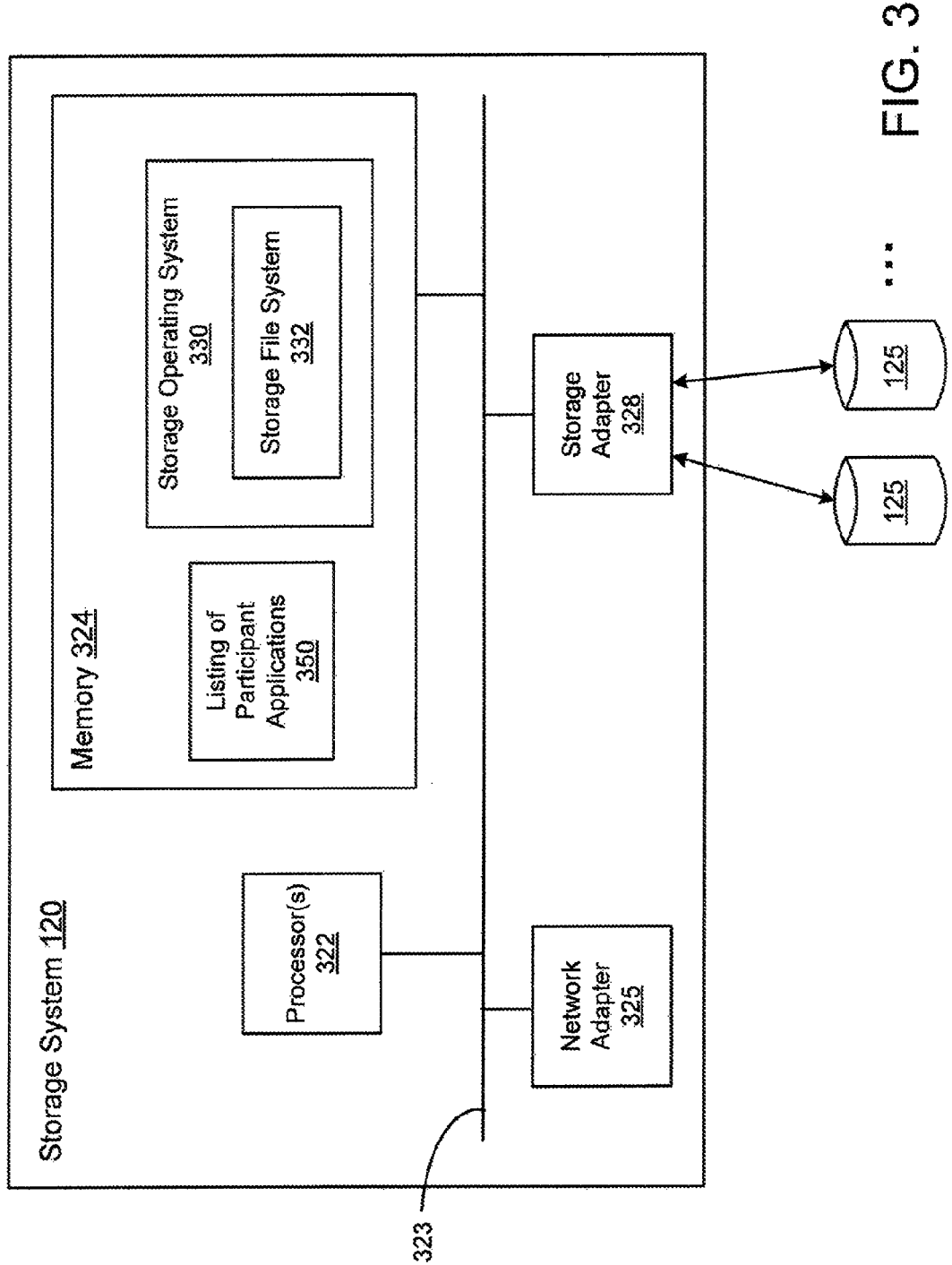
FIG. 3 is a diagram illustrating various components of the storage system, in accordance with some embodiments.

FIG. 3 is a diagram illustrating various components of the storage system 120, in accordance with some embodiments. Specifically, the storage system comprises one or more processors 322, a memory 324, a network adapter 325, and a storage adapter 328 interconnected by a system bus 323. The storage system 120 executes a storage operating system 330 that implements a storage file system 332. The memory 324 comprises storage locations that are addressable by the processors 322 and adapters 325 and 328 for storing software program code (such as the storage operating system 330) and data. The processor and adapters may, in turn, comprise processing elements and/or love circuitry configured to execute the software code and manipulate various data.

The network adapter 325 comprises a plurality of ports adapted to couple the storage system 120 to one or more server systems 110 over point-to-point links, wide area networks, virtual private networks implemented over a public network (Internet) or a shared local area network. A server system 110 may establish a connection with a storage system 120 through the network adapter 325 to access the storage devices 125 of the storage system (through use of the storage adapter 328). In some embodiments, a lower-level application 235 (participant application) executing on the server system 110 may establish a connection with a storage system 120 to access the storage devices 125.

The storage adapter 328 is coupled with the storage devices 125 of the storage system and cooperates with the storage operating system 330 to access particular data on the storage devices 125 (e.g., as requested by a lower-level application 235 executing on the server system 110). The storage adapter 328 comprises a plurality of ports having input/output (I/O) interface circuitry that couples to the storage devices 125 over an I/O interconnect arrangement.

The storage operating system 330, portions of which are typically resident in memory 324 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein. The storage system 120 executes a storage operating system 330 that implements a storage file system 332. In this sense, the Data ONTAP® storage operating system, available from Network Appliance, Inc. of Sunnyvale, Calif., that implements a Write Anywhere File Layout (WAFL®) file system, is an example of such a storage operating system implemented as a microkernel within an overall protocol stack and associated storage. The storage operating system 330 can also be implemented as an application program operating over a general-purpose operating system, such as UNIX® or Windows®, or as a general-purpose operating system with configurable functionality, which is configured for storage applications as described herein.

The storage operating system 330 may implement the storage file system 332 to logically organize data on the storage devices 125 as one or more storage objects and provide a logical/virtual representation of how the storage objects are organized on the storage devices 125. As such, a collection of one or more storage systems 120 may also organize and store one or more storage objects. As used herein, a storage object comprises any logically definable storage element stored or contained within a collection of storage systems. A non-exhaustive list of storage object examples include one or more logical units (LUs) in at q tree, one or more q trees in a volume, one or more volumes in a storage system, a set of one or more storage systems in a collection of storage systems (i.e., all data contained in the set of one or more storage systems), the entire collection of storage systems (i.e., all data contained in the entire collection of storage systems), etc. In other embodiments, storage objects comprise any other logically definable storage element stored or contained within a collection of storage systems.

The storage operating system 330 of a storage system 120 also manages access to the storage objects stored on the storage devices 125. In some embodiments, a lower-level application 235 (participant application) executing on the server system 110 may establish a connection with the storage operating system 330 to access storage devices 125 of the storage system 120. The lower-level application 235 may implement various connections having various protocols to establish a connection with the storage system 120, such as an iSCSI or a Transport Control Protocol (TCP) connection.

In some embodiments, to establish a connection with a storage system 120, the lower-level application 235 submits a connection request having a unique identifier and password assigned to the lower-level application 235. The storage operating system 330 may validate or reject the connection request using a listing of participant applications 350 (e.g., stored in memory 324) containing records of unique identifiers and passwords of lower-level applications 235 that have registered with the storage system 120 through an initiation phase (discussed below). If the storage operating system 330 verifies that the listing of participant applications 350 contains the received identifier and password, the storage operating system 330 may allow the lower-level application 235 to establish a connection with the storage system 120.

If a connection is established with the storage system 120, the lower-level application 235 (participant application) may then begin sending access requests to the storage system 120 for execution. In some embodiments, the storage operating system 330 is configured to perform each access request received from a participant application that has established a connection with the storage system 120 using a unique identifier and password (provided during the initiation phase) and to perform the received access request without first performing any form of authorization verification (in regards to any parameter, such as user, operation, or storage object) on the access request. In these embodiments, the storage operating system 330 is configured to completely "trust" such a participant application and to perform all access requests received from the participant application and to not determine whether the access requests are allowed or not allowed to be perfumed on the storage system 120.

Centralized Authorization for a Storage System Collection

Figure 4:
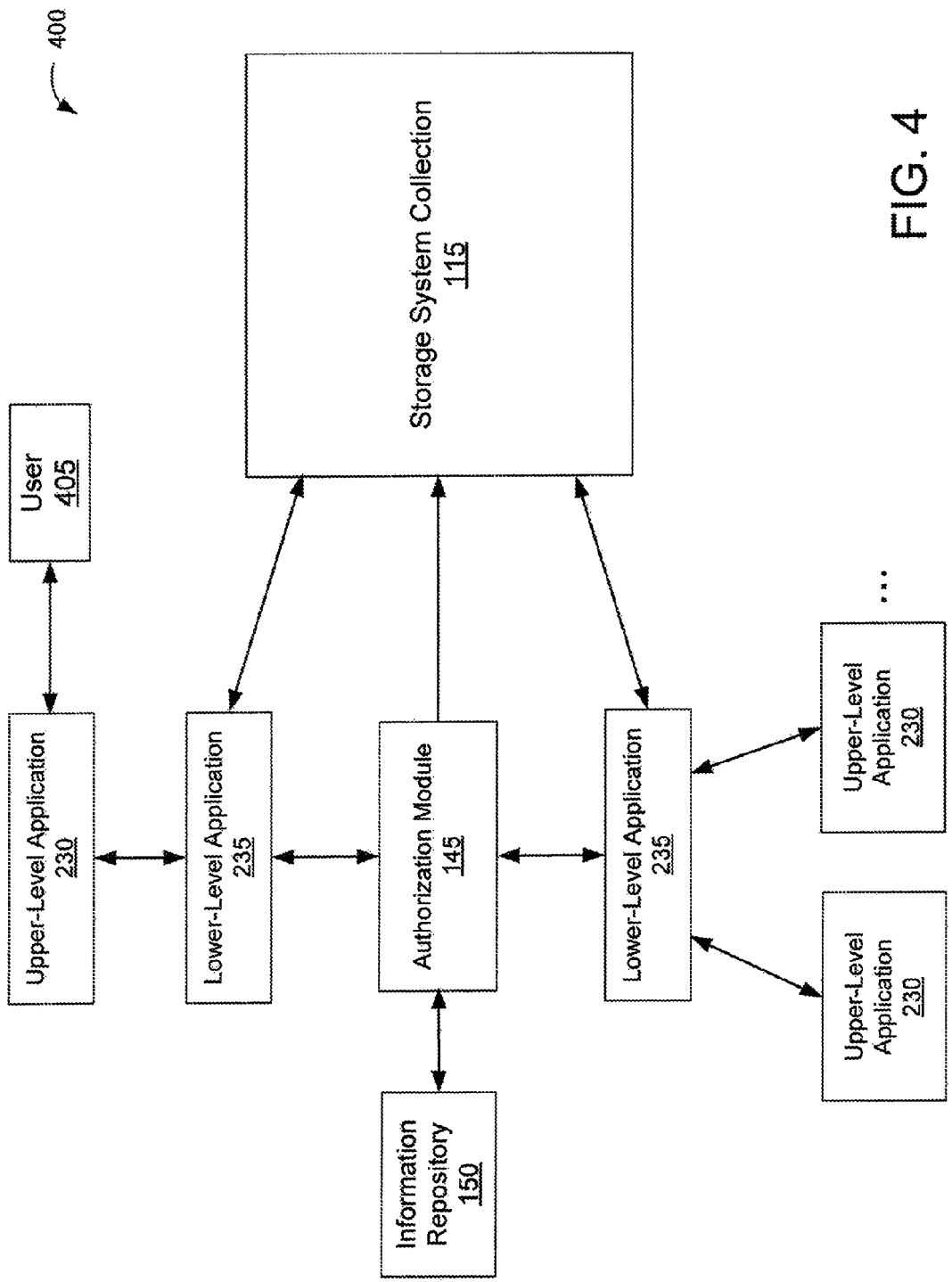
FIG. 4 shows a conceptual diagram of a centralized authorization system in which some embodiments operate.

FIG. 4 shows a conceptual diagram of a centralized authorization system 400 in which some embodiments operate. The centralized authorization system 400 comprises one or more upper-level applications 230, one or more lower-level applications 235, a storage system collection 115, an authorization module 145, and a repository of access permission information 150. The upper-level and lower-level applications 230 and 235 may execute on one or more server systems 110 connected (e.g., via a connection system 130) with the storage system collection 115.

During an initiation phase (discussed below in Section II), the lower-level application 235 may be configured to send an initiation request to the authorization module 145 to register with the authorization module 145 and receive a unique identifier and password. During a runtime phase (discussed below in Section III), the lower-level application 235 may access the storage system collection 115 using the unique identifier and password. During the runtime phase, the upper-level application 230 may receive, from a user 405, access requests for accessing the storage system collection 115. The upper-level application 230 may interface with a lower-level application 235 to send the access requests to the lower-level application 235. In some embodiments, one or more upper-level application 230 may send access requests to a single shared lower-level application 235. The upper-level application 230 and the lower-level application 25 with which it interfaces may execute on the same server system 110 or on different server systems 110. The lower-level application 235 may interface with the authorization module 145 and the storage system collection 115 to handle the received access requests.

The storage system collection 115 may comprise one or more storage systems 120, each storage system 120 comprising one or more storage devices 125. The storage system collection 115 contains or stores one or more storage objects. In some embodiments, an access request submitted to the storage system collection 115 specifies an operation to be performed upon a particular storage object stored on the storage system collection 115. The particular storage object may be stored on one storage system 120 or multiple storage systems 120 of the storage system collection 115.

In some embodiments, for each received access request, the lower-level application 235 sends an authorization request to the authorization module 145 for determining authorization of the access request (by determining whether the access request is permitted). The authorization module 145 may be configured to determine received authorization requests using a centralized repository of access permission information 150. As such, the access permission information used to authorize access requests for multiple server systems 110 and multiple storage systems 120 may be easily maintained and updated. The authorization module 145 may execute on a separate authorization console 140 connected (e.g., via a connection system 130) with the one or more server systems 110 and the storage system collection 115. The repository of information 150 may also be stored on authorization console 140. In other embodiments, the authorization module 145 and/or repository of information 150 do not reside on a separate authorization console 140 and may reside on a server system 110 or a storage system 120.

II. Initiation Phase for Registering Participant Applications

Figure 5:
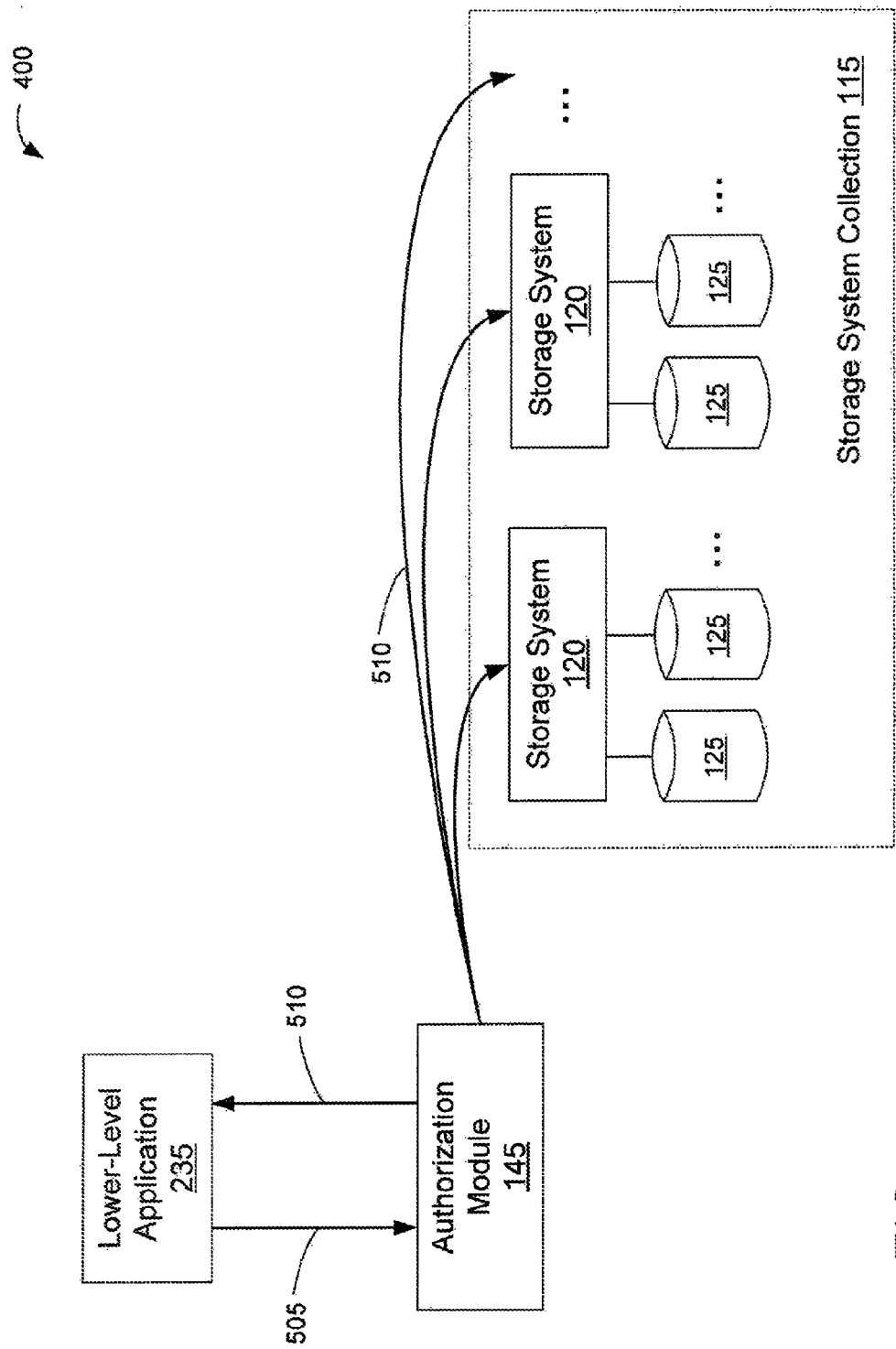
FIG. 5 shows a conceptual diagram of an initiation phase for the centralized authorization system.

FIG. 5 shows a conceptual diagram of an initiation phase for the centralized authorization system 400 of FIG. 4. The initiation phase may be used for registering a lower-level application 235 as a participant application in the centralized authorization system 400. As discussed above, a participant application uses the authorization module 145 for authorizing access requests and a participant storage system also uses the authorization module 145 for authorizing access requests. In the embodiments described below, the storage system collection 115 comprise a set of one or more participant storage systems. In some embodiments, an initiation phase is performed for each participant application 235 and participant storage system 120 prior to using the authorization module for authorizing access requests (during a runtime phase).

In the initiation phase, a lower-level application 235 may be configured to send an initiation request 505 to the authorization module 145 to register with the authorization module 145. In some embodiments, the initiation request 505 contains credential information describing the lower-level application 235. The credential information may include information indicating that the lower-level application 235 is configured to properly implement the authorization module 145. For example, the credential information may show that, upon receiving an access request, the lower-level application 235 is configured to first send an authorization request to the authorization module 145 and receive authorization of the access request from the authorization module 145, prior to sending the access request to the storage system collection 115. In some embodiments, the authorization module 145 is configured to validate the initiation request from an application only if the credential information shows that the application is configured to properly implement the authorization module 145.

Upon validating an initiation request 505, the authorization module 145 may generate a unique identifier and password for the lower-level application 235. The authorization module 145 may then transmit/push the unique identifier and password 510 to the lower-level application 235 and to each participant storage system 120 in the storage system collection 115. Each participant storage system may store a record at the received unique identifier and password 510 in a listing of lower-level applications 350 (stored, for example, in memory 324) that contains records of unique identifiers and passwords of all lower-level applications 235 that have registered with the participant storage system 120 through the initiation phase.

The lower-level application 235 may be configured to send the initiation request 505 automatically (without human initiation or intervention), e.g., upon installation of the lower-level application 235 on to server system 110. The authorization module 145 may be configured to determine validation of the initiation request 505, determine the unique identifier and password 510, and transmit/push the unique identifier and password 510 to the lower-level application 235 and to each participant storage system 120 automatically (without human initiation or intervention). As such, the initiation phase may be performed automatically for each lower-level application 235 and a human administrator need not manually register each lower-level application 235 that is to implement the authorization module 145.

Figure 6:
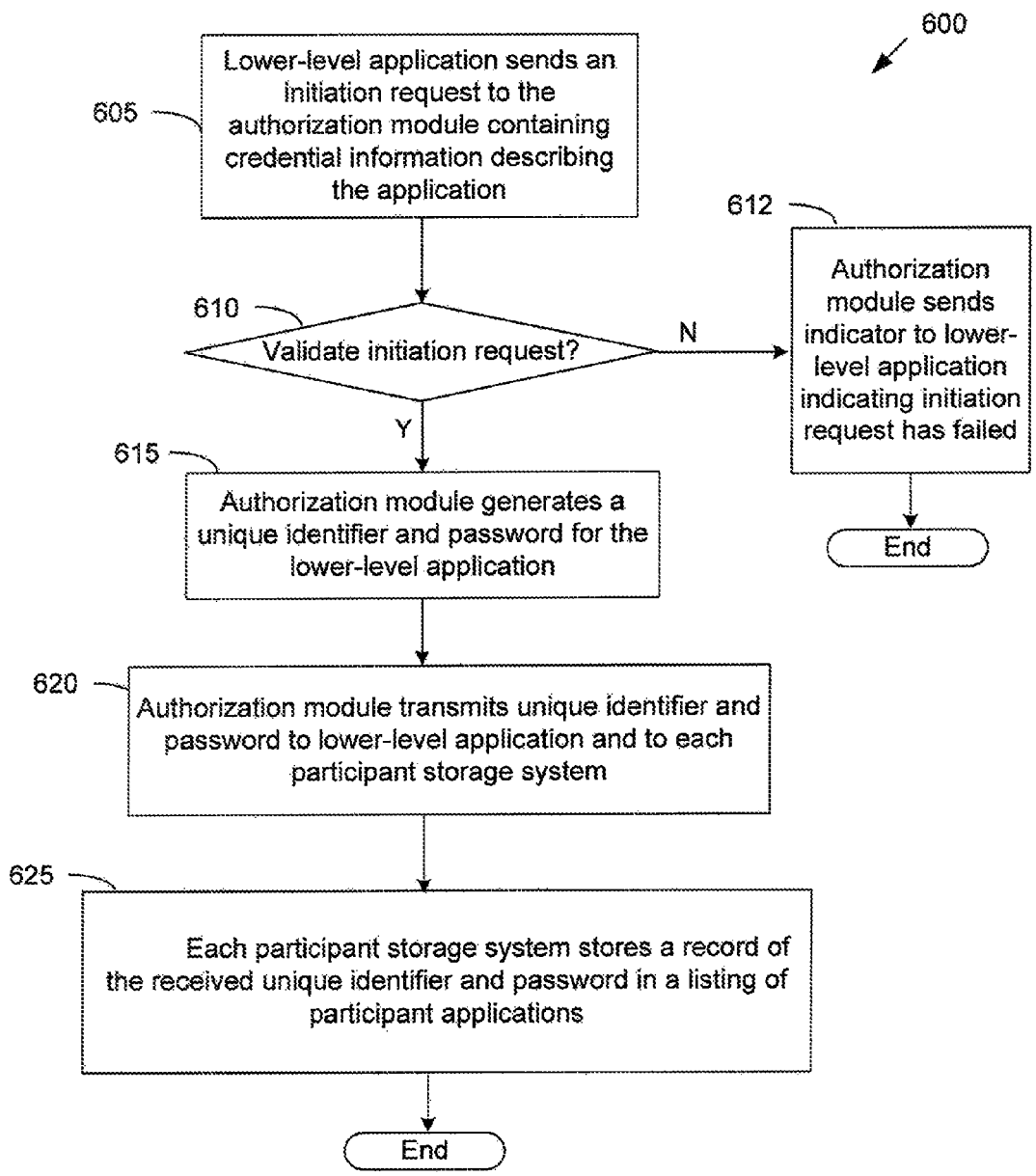
FIG. 6 is a flowchart of an initiation phase method for registering an application in the centralized authorization system.

FIG. 6 is a flowchart of an initiation phase method 600 for registering a lower-level application 235 as a participant application in the centralized authorization system 400. The method 600 is described in relation to FIGS. 4 and 5. In some embodiments, the method 600 is implemented by software or hardware configured to perform the initiation phase for a participant application 235. In some embodiments, the steps of method 600 are performed by various software components executing on the server system 110, the authorization console 140, and the collection of storage systems 115. For example, in some embodiments, the steps of method 600 may be performed by a lower-level application 235, the authorization module 145, and/or a storage operating system 330. The order and number of steps of the method 600 are for illustrative purposes only and, in other embodiments, a different order and/or number of steps are used.

The method 600 begins when a lower-level application 235 sends (at 605) an initiation request 505 to the authorization module 145. In some embodiments, the lower-level application 235 may be configured to send the initiation request 505 automatically (without human initiation or intervention) upon installation of the lower-level application 235 on a server system 110. In some embodiments, the initiation request 505 contains credential information describing the lower-level application 235 (e.g., such as information indicating that the lower-level application 235 is configured to properly implement the authorization module 145).

The authorization module 145 then determines (at 610) whether to validate the received initiation request 505 based on the credential information. In some embodiments, the authorization module 145 is configured to validate the initiation request only the credential information shows that the lower-level application 235 is configured to properly implement the authorization module 145, if the authorization module 145 determines (at 610 - No) not to validate the initiation request, the authorization module 145 sends (at 612) an indicator to the lower-level application 235 indicating that the initiation request has failed. The method 600 then ends.

If the authorization module 145 determines (at 610 - Yes) to validate the initiation request, the authorization module 145 then generates (at 615) a unique identifier and password for the lower-level application 235. The authorization module 145 then transmits (at 620) the unique identifier and password 510 to the lower-level application 235 and to each participant storage system 120 in the storage system collection 115. The authorization module 145 may be configured to determine validation of the initiation request 505, generate the unique identifier and password 510 and transmit the unique identifier and password 510 to the lower-level application 235 and to each participant storage system 120 automatically (without human initiation or intervention).

Each participant storage system then stores (at 625) a record of the received unique identifier and password 510 for the lower-level application 235. In some embodiments, the participant storage system stores records of received unique identifier and password 510 Or registered lower-level applications in a listing of participant applications 350 (stored, for example, in memory 324). The method 600 then ends. The method 600 may then be repeated for each lower-level application 235 that is to implement the authorization module 145.

During the runtime phase (discussed in Section III), each participant application 235 is completely trusted by each participant storage system 120, whereby any access request received from a participant application 235 will be performed without the participant storage system 120 performing any type of authorization cheek on the access request. A participant application 235 is trusted completely since it has been validated by the authorization module 145 during the initiation phase where it has shown it is configured to first receive authorizations for access requests from the authorization module 145 prior to sending them to the storage system collection 115.

III. Runtime Phase for Authorizing Access Requests

Figure 7:
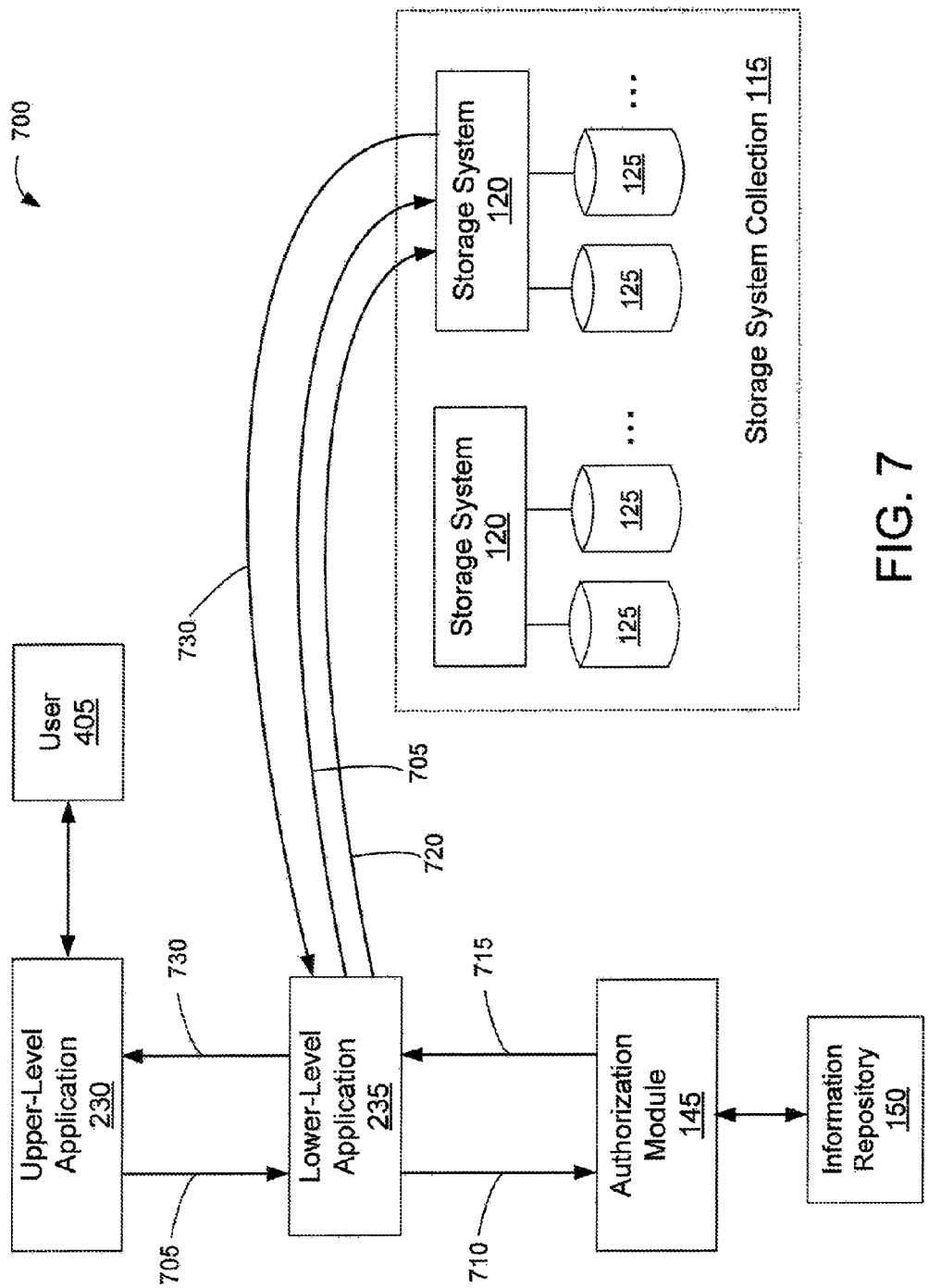
FIG. 7 shows a conceptual diagram of a runtime phase for the centralized authorization system.

FIG. 7 shows a conceptual diagram of a runtime phase for the centralized authorization system 400 of FIG. 4. In the embodiments described below, the lower-level application 235 comprises a participant application that has successfully registered with the authorization module 145 (during an initiation phase) and the storage system collection 115 comprises a set of one or more participant storage systems 120.

In the runtime phase, a user 405 may log into an upper-level application 230, for example, by sending user identification information. The upper-level application 230 may allow the user 405 to login upon verifying that user 405 is permitted to use the upper-level application (e.g., using the user identification information). The upper-level application 230 provides and supports a set of one or more operations (e.g., read or write-type operations) that may he performed on the storage system collection 115. Once logged in, the user 405 may interact with the upper-level application 230 (e.g., via a user interface) to submit operation requests specifying operations to be performed on storage objects of the storage system collection 115. For each operation request received from the user 405, the upper-level application 230 sends an access request 705 to the lower-level/participant application 235. The access request 705 may include information regarding the user 405 (e.g., user identification information), the specified operation (e.g., operation identification information), and/or the specified storage object (e.g., a server address path to the storage object).

For each received access request 705, the participant application 235 sends an authorization request 710 to the authorization module 145 for determining authorization of the access request 705 (by determining whether the access request 705 is permitted). The authorization request 710 may contain information regarding, the access request 705. In some embodiments, the authorization request 710 may contain information regarding the user 405 sending the access request (e.g., user identification information), the specified operation (e.g., operation identification information), and/or the storage object (e.g., a storage address path to the storage object), in some embodiments, the participant application 235 may receive from the upper-level application 230) an access request having a server address path to a particular storage object (the server address path being specified by the server tile system 250) and translate/map the server address path to a storage address path to the particular storage object (the storage address path being specified by the storage file system 332). The participant application 235 may then include the storage address path (rather than the server address path) to the particular storage object in the authorization request 710.

The authorization module 145 may determine the outcome of a received authorization request 710 (for a particular access request 705) based on any one or more parameters received in the authorization request 710 (e.g., based on the user, operation, or storage object parameters, or any combination of parameters thereof). In some embodiments, the authorization module 145 may receive an authorization request 710 containing user, operation, and storage object parameters and determine the outcome of the authorization request based on user, operation, and storage object parameters to provide granular/precise control of access to the storage system collection 115. In these embodiments, the authorization module 145 may be configured so that it will approve an authorization request 710 (for a particular access request 705) only upon determining that the particular user 405 is authorized to perform the particular operation on the particular storage object specified by the access request 705.

The authorization module 145 may use a centralized repository of access permission information 150 to determine authorization requests lot access requests 70. The repository of information 150 may vary in size and/or complexity. For example, the repository of information 150 may contain permission information for access requests based on users, operations, or storage objects, or any combination thereof. In some embodiments, the repository of information 150 comprises a database containing information regarding a plurality of users 405, operations allowed to be performed by each user, and, bar each allowed operation, the specific storage objects stored on the storage system collection 115 upon which the allowed operation may be performed. Below is a conceptual example of the repository of information 150 in the form of a table:

| User | Operation | Storage Object |
|---|---|---|
| U1 | archive | storage systems M, P, K |
|  | restore | volumes A, D in storage system P |
| U2 | backup | volumes A, B, C in storage system M |
| U3 | restore | LUs X, Y in a q tree R |
|  | backup | LU Z in a q tree T |
| ... | ... | ... |

In some embodiments, the authorization module 145 comprises the DataFabric® Manager (DFM) program by Network Appliance, Inc., of Sunnyvale, Calif.) which implements role-based access control (RBAC) technology (also provided by Network Appliance, Inc, of Sunnyvale, Calif.). Role-based access controls allow administrators to group capabilities into roles and then assign those roles to users and groups of users. Capabilities may comprise an operation and a resource. The resource may be a storage object or a collection of storage objects. The DFM program and RBAC technology of some embodiments is described further in U.S. patent application 11/601,095, entitled Resource Level Role Based Access Control tor Storage Management, filed Nov. 7, 2006 by Timothy J. Thompson, James Hartwell Holl II, William Raoul Durant (assignee Network Appliance, Inc., Sunnyvale, Calif.), which is incorporated herein by reference.

After determining the outcome of the received authorization request 710, the authorization module 145 sends an authorization response 715 to the participant application 235. The authorization response 715 indicates whether the authorization request 710 (for a particular access request 705) has been approved or not approved by the authorization module 145. If the authorization response 715 indicates non-approval of the authorization request 710, the participant application 235 sends an access response 730 to the upper-level application 230, the access response 730 indicating that the access request 705 has been rejected.

However, if the authorization response 715 indicates approval of the authorization request 710, the below procedures may be performed. As used herein, one or more "target" storage systems 120 comprise the one or more participant storage systems 120 in the storage system collection 115 that contain or store the storage object specified in the access request 705. If a connection between the participant application 235 and a target storage system 120 has not already been established, the participant application 235 sends a connection request 720 to the target storage system 120. The connection request 720 may contain the unique identifier and password 710 of the participant application 235. The target storage system 120 may allow the connection request 720 if it verifies that the received identifier and password 710 is contained in a listing of participant applications 350.

After a connection is established with the target storage system 120, the participant application 235 sends the access request 705 to the target storage system 120. The access request 705 may specify a particular operation to be performed upon a particular storage object stored in the target storage system 120. In some embodiments, the storage object is specified by a storage address path specified by the storage file system 332 (as translated from server address path earlier participant application 235). The target storage system 120 performs the received access request 705 (without performing its own authorization check) and returns an access response 730 to the participant application 235 indicating that the access request 705 has been performed. If the access request 705 contained a read operation on a particular storage object, the access response 730 also include the requested data of the particular storage object. The participant application 235 then sends/forwards the access response 730 to the upper-level application 230.

Figure 8A:
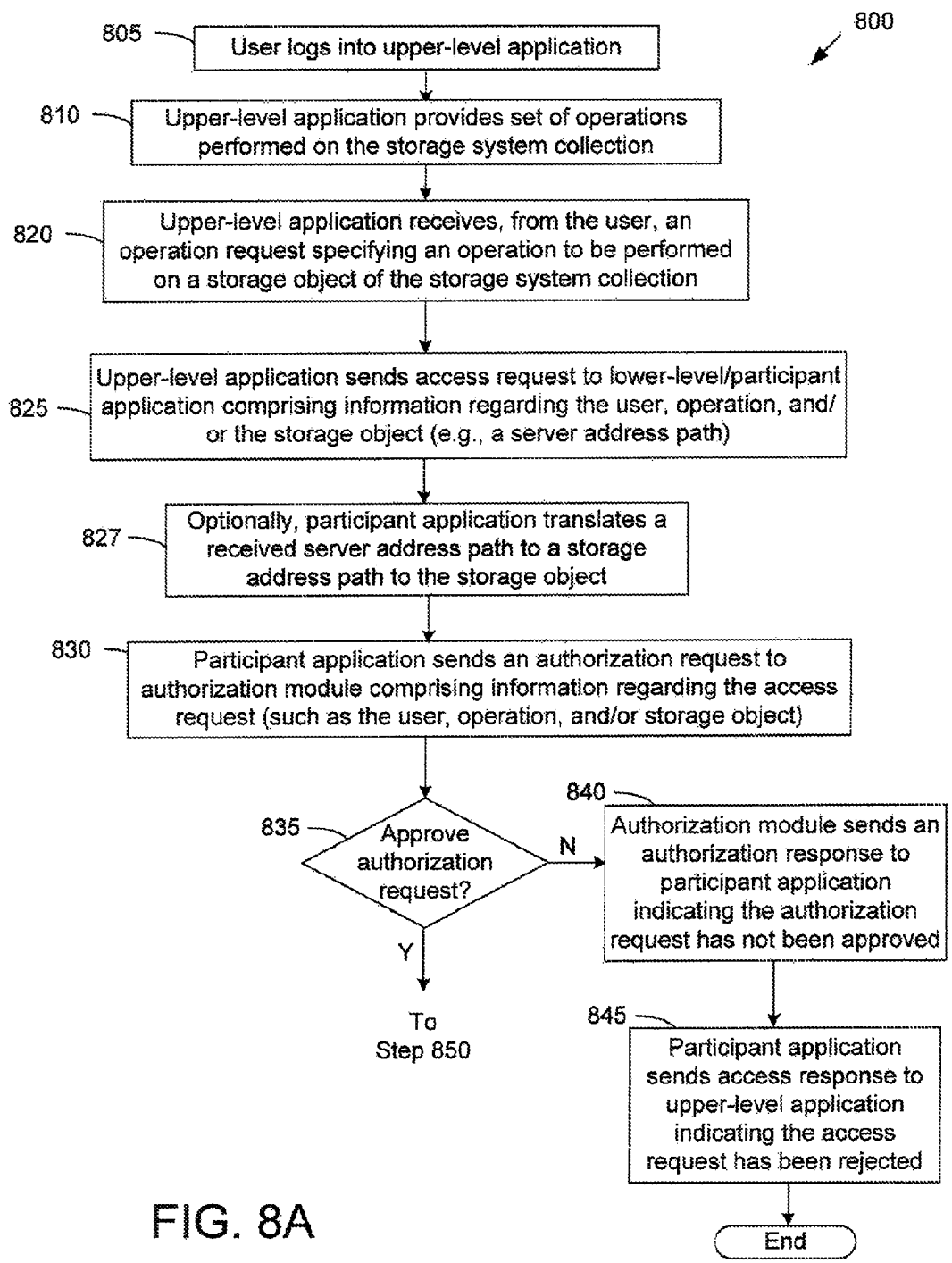
FIGS. 8A-B are flowcharts of a runtime phase method for authorizing access requests in the centralized authorization system.
Figure 8B:
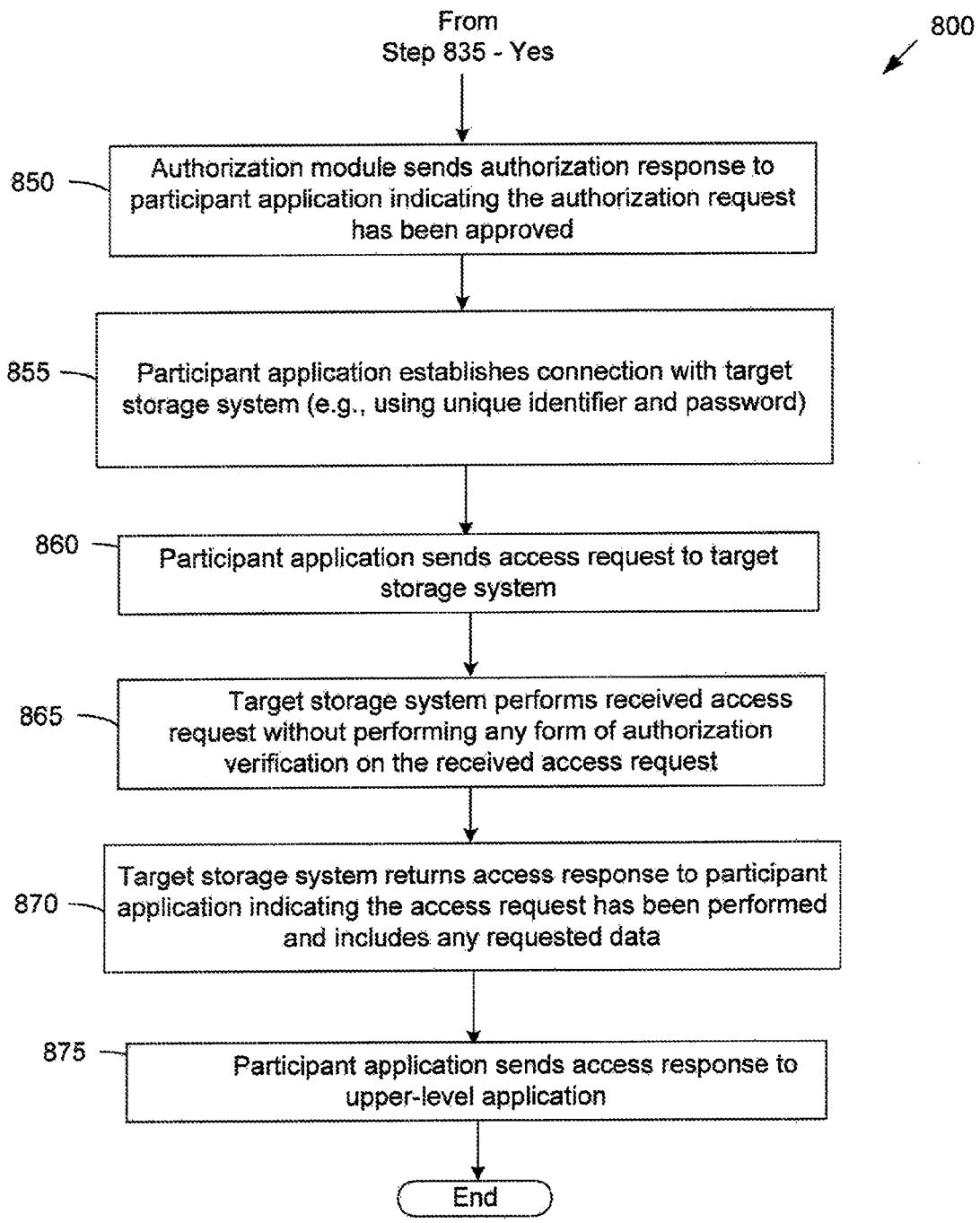

FIGS. 8A-B are flowcharts of a runtime phase method 800 for authorizing access requests far a storage system collection 115 in the centralized authorization system 400. The method 800 is described in relation to FIGS. 4 and 7. In some embodiments, the method 800 is implemented by software or hardware configured to perform the runtime phase. In some embodiments, the steps of method 800 are performed by various software components executing on the server system 110, the authorization console 140, and the collection of storage systems 115. For example, in some embodiments, the steps of method 800 may be performed by an upper-level application 230, lower-level application 235, the authorization module 145, and/or storage operating system 330. The order and number of steps of the method 800 are for illustrative purposes only and, in other embodiments, a different order and/or number of steps are used.

The method 800 begins when a user logs into (at 805) an upper-level application 230 using user identification information. The upper-level application 230 provides (at 810) a set of one or more operations (e.g., read or write-type operations) that may be performed on the storage system collection 115. At step at 820, the upper-level application 230 receives, from the user 405, an operation request specifying an operation to be performed on a storage object of the storage system collection 115. The upper-level application 230 then sends (at 825) an access request 705 to the lower-level/participant application 235, the access request 705 comprising information regarding the user 405, the specified operation, and/or the specified storage object (e.g., a server address path to the storage object). As an optional step, the participant application 235 translates (at 827) a received server address path (specified by the server file system 250 to a storage address path (specified by the storage file system 332) to the storage object.

The participant application 235 then sends (at 830) an authorization request 710 to the authorization module 145. The authorization request 710 comprises information regarding the access request 705, such as information regarding the user 405 sending the access request 705, the specified operation, and/or the storage object (e.g., a storage address path to the storage object). The authorization module 145 then determines (at 835) whether to approve the received authorization request 710 based on the user, operation, or storage object parameters, or any combination of the parameters thereof. In some embodiments, the authorization module 145 approves the received authorization request 710 (for a particular access request 705) only upon determining that the particular user 405 is authorized to perform the particular operation on the particular storage object specified by the access request 705. The authorization module 145 may use a centralized repository of access permission information 150 to determine whether to approve the authorization request 710.

If the authorization module 145 determines (at 835 - No) to not approve the authorization request 710, the authorization module 145 sends (at 840) an authorization response 715 to the participant application 235 indicating that the authorization request 710 has not been approved. The participant application 235 then sends (at 845) an access response 730 to the upper-level application 230 indicating that the access request 705 has been rejected. The method 800 then ends.

If the authorization module 145 determines (at 835 - Yes) to approve the authorization request 710, the authorization module 145 sends (at 850) an authorization response 715 to the participant application 235 indicating that the authorization request 710 has been approved. As used herein, one or more "target" storage systems 120 comprise the one or more participant storage systems 120 in the storage system collection 115 that contain or store the storage object specified in the access request 705. If a connection between the participant application 235 and a target storage system 120 has not already been established, the participant application 235 establishes (at 855) a connection with each target storage system 120. The participant application 235 may establish a connection to a target storage system 120 by sending a connection request 720 (containing a unique identifier and password 710) to a target storage system 120, whereby the target storage system 120 approves the connection request 720 by verifying that the received identifier and password 710 is contained in a listing of participant applications 350. In other embodiments, a new connection between the participant application 235 and a target storage system 120 is established (using a unique identifier and password) for each access request sent from the participant application 235 to the target storage system 120.

After a connection is established with a target storage system 120, the participant application 235 sends (at 840) the access request 705 to the target storage system 120. The target storage system 120 performs (at 865) the received access request 705 without performing any form of authorization verification on the received access request 705. The target storage system 120 returns (at 870) en access response 730 to the participant application 235 indicating that the access request 705 has been performed. If the access request 705 contained a read operation on a particular storage object, the access response 730 may also include the requested data of the particular storage object. The participant application 235 then sends (at 875) the access response 730 to the upper-level application 230. The method 800 then ends.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for authorizing access requests for accessing a storage system, the system comprising:
    an authorization module configured for determining authorization of access requests for a first storage system;
    a first server system comprising a first application configured for:
        sending an initiation request to the authorization module;
        receiving an access request for accessing the first storage system;
        sending an authorization request to the authorization module for authorizing the access request; and
        only upon receiving an authorization of the access request from the authorization module, sending the access request to the first storage system;
    the first storage system comprising a set of one or more storage devices, the first storage system configured for performing the access request received from the first application without determining authorization of the received access request; and
    a network connecting the authorization module, first server system, and first storage system, wherein the authorization module resides and executes externally from the first server system and the first storage system, wherein the authorization module is further configured for generating a unique identifier and a password for the first application to connect with the first storage system and sending the unique identifier and password to the first application and the first storage system.

2. The system of claim 1, wherein:
    the access request is received from a user, the access request specifying an operation on a storage object stored on the first storage system; and
    the authorization module is further configured for only upon determining that the user is permitted to perform the specified operation on the specified storage object, sending an authorization of the access request to the first application.

3. The system of claim 1, wherein the first server system further comprises a second application configured for:
    supporting a set of one or more operations on the first storage system;
    receiving the access request from a user, the access request specifying an operation in the set of operations; and
    sending the access request to the first application.

4. The system of claim 1, wherein:
    the initiation request comprises credential information describing the first application; and
    the authorization module is further configured for generating and sending the unique identifier and password only upon determining that the credential information indicates that the first application is configured to only send the access request to the first storage system after receiving an authorization of the access request from the authorization module.

5. The system of claim 1, wherein:
    the first application is further configured for connecting with the first storage system using the unique identifier and password; and
    the first storage system is further configured for, after the connection is established with the first application, thereafter performing all access requests received from the first application without determining authorization of the received access requests.

6. A system for authorizing access requests for accessing a storage system, the system comprising:
    an authorization module configured for determining authorization of access requests for a first storage system;
    a first server system comprising:
        a first application configured for:
            receiving an access request for accessing the first storage system;
            sending an authorization request to the authorization module for authorizing the access request; and
            only upon receiving an authorization of the access request from the authorization module, sending the access request to the first storage system; and
        a second application configured for:
            supporting a set of one or more operations on the first storage system;
            receiving the access request from a user, the access request specifying an operation in the set of operations; and
            sending the access request to the first application;
    the first storage system comprising a set of one or more storage devices, the first storage system configured for performing the access request received from the first application without determining authorization of the received access request; and
    a network connecting the authorization module, first server system, and first storage system, wherein the authorization module resides and executes externally from the first server system and the first storage system,
    wherein:
    the first storage system comprises a first file system for organizing one or more storage objects stored on the first storage system;
    the first server system comprises a second file system for organizing the one or more storage objects; and
    the first application is further configured for:
        receiving, from the second application, the access request comprising a server address path to a storage object, the server address path being specified by the second file system; and
        mapping the server address path to a storage address path to the storage object, the storage address path being specified by the first file system.

7. A system for authorizing access requests for accessing a storage system, the system comprising:
    an authorization module configured for determining authorization of access requests for a first storage system;
    a first server system comprising a first application configured for:
        receiving an access request for accessing the first storage system;
        sending an authorization request to the authorization module for authorizing the access request; and only upon receiving an authorization of the access request from the authorization module, sending the access request to the first storage system;

the first storage system comprising a set of one or more storage devices, the first storage system configured for performing the access request received from the first application without determining authorization of the received access request;

a network connecting the authorization module, first server system, and first storage system, wherein the authorization module resides and executes externally from the first server system and the first storage system; and a second server system comprising a second application configured for:

receiving an access request for accessing the first storage system;

sending an authorization request to the authorization module for authorizing the access request; and only upon receiving an authorization of the access request from the authorization module, sending the access request to the first storage system, wherein:

the first storage system is configured for performing the access request received from the second application without determining authorization of the received access request; and the network connects the authorization module, first and second server systems, and first storage system.

8. A system for authorizing access requests for accessing a storage system, the system comprising:

an authorization module configured for determining authorization of access requests for a first storage system;

a first server system comprising a first application configured for:

receiving an access request for accessing the first storage system;

sending an authorization request to the authorization module for authorizing the access request; and only upon receiving an authorization of the access request from the authorization module, sending the access request to the first storage system;

the first storage system comprising a set of one or more storage devices, the first storage system configured for performing the access request received from the first application without determining authorization of the received access request;

a network connecting the authorization module, first server system, and first storage system, wherein the authorization module resides and executes externally from the first server system and the first storage system; and a second storage system comprising a set of one or more storage devices, wherein:

the authorization module is further configured for determining authorization of access requests for a second storage system;

the first application is further configured for receiving an access request for accessing the second storage system, sending an authorization request to the authorization module for authorizing the access request, and only upon receiving an authorization of the access request from the authorization module, sending the access request to the second storage system;

the second storage system is configured for performing the access request received from the first application without determining authorization of the received access request; and the network connects the authorization module, first server system, and first and second storage systems.

9. A method for authorizing access requests for accessing a storage system, the method comprising:

providing an authorization module configured for determining authorization of access requests for a first storage system;

providing a first server system comprising a first application configured for:

sending an initiation request to the authorization module;

receiving an access request for accessing the first storage system;

sending an authorization request to the authorization module for authorizing the access request; and only upon receiving an authorization of the access request from the authorization module, sending the access request to the first storage system;

providing the first storage system comprising a set of one or more storage devices, the first storage system configured for performing the access request received from the first application without determining authorization of the received access request; and providing a network connecting the authorization module, first server system, and first storage system, wherein the authorization module resides and executes externally from the first server system and the first storage system, wherein the authorization module is further configured for generating a unique identifier and a password for the first application to connect with the first storage system and sending the unique identifier and password to the first application and the first storage system.

10. The method of claim 9, wherein:

the access request is received from a user, the access request specifying an operation on a storage object stored on the first storage system; and the authorization module is further configured for:

only upon determining that the user is permitted to perform the specified operation on the specified storage object, sending an authorization of the access request to the first application.

11. The method of claim 9, wherein the initiation request comprises credential information describing the first application; and the authorization module is further configured for:

generating and sending the unique identifier and password only upon determining that the credential information indicates that the first application is configured to only send the access request to the first storage system after receiving an authorization of the access request from the authorization module.

12. The method of claim 9, wherein the first application is further configured for:

connecting with the first storage system using the unique identifier and password; and the first storage system is further configured for:

after the connection is established with the first application, thereafter performing all access requests received from the first application without determining authorization of the received access requests.

13. A system for registering an application for using an authorization module for authorizing access requests for accessing a storage system, the system comprising:

a server system comprising an application configured for sending an initiation request to the authorization module, the initiation request comprising credential information describing the application;

the authorization module configured for:
- generating a unique identifier and a password for the application to connect with the storage system; and
- sending the unique identifier and password to the application and the storage system, wherein the authorization module generates and sends the unique identifier and password only upon determining that the credential information indicates that the application is configured to only send an access request to the storage system after receiving an authorization of the access request from the authorization module;

the storage system comprising a set of one or more storage devices, the storage system configured for receiving and storing the unique identifier and password for the application; and a network connecting the authorization module, server system, and storage system, wherein the authorization module resides and executes externally from the server system and the storage system.

14. The system of claim 13, wherein:
the application is further configured for connecting with the storage system using the unique identifier and password; and
the storage system is further configured for, after the connection is established with the application, thereafter performing all access requests received from the application without determining authorization of the received access requests.

15. The system of claim 13, wherein the application is configured for sending the initiation request to the authorization module automatically, without human initiation or intervention.

16. A method for registering an application for using an authorization module for authorizing access requests for accessing a storage system, the method comprising:
providing a server system comprising an application configured for sending an initiation request to the authorization module, the initiation request comprising credential information describing the application; providing the authorization module configured for:
- generating a unique identifier and a password for the application to connect with the storage system; and
- sending the unique identifier and password to the application and the storage system, wherein the authorization module generates and sends the unique identifier and password only upon determining that the credential information indicates that the application is configured to only send an access request to the storage system after receiving an authorization of the access request from the authorization module;

providing the storage system comprising a set of one or more storage devices, the storage system configured for receiving and storing the unique identifier and password for the application; and providing a network connecting the authorization module, server system, and storage system, wherein the authorization module resides and executes externally from the server system and the storage system.

17. The method of claim 16, wherein:
the application is further configured for connecting with the storage system using the unique identifier and password; and
the storage system is further configured for, after the connection is established with the application, thereafter performing all access requests received from the application without determining authorization of the received access requests.

18. The method of claim 16, wherein the application is configured for sending the initiation request to the authorization module automatically, without human initiation or intervention.

* * * * *